Figure 1:
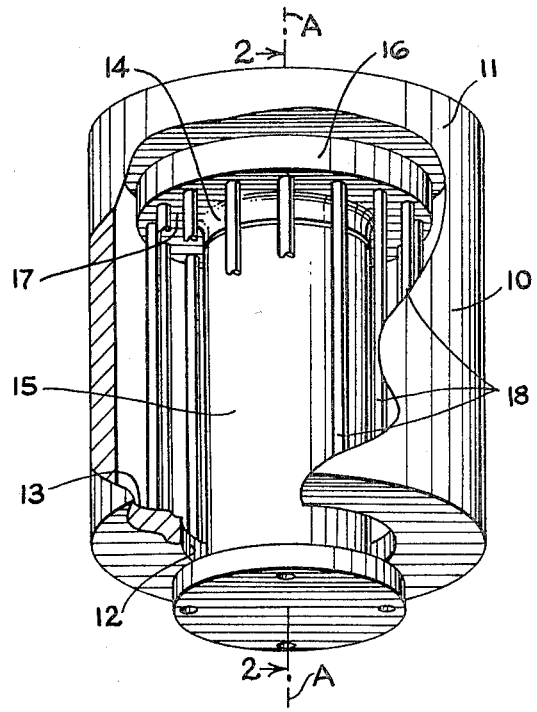

Aug. 16, 1966   A. N. ORMOND   3,266,758

SHROUD FLEXURE

Filed Sept. 12, 1963

INVENTOR.
ALFRED N. ORMOND
BY *Elliott & Pastoriza*
ATTORNEYS.

United States Patent Office 3,266,758
Patented August 16, 1966

3,266,758
SHROUD FLEXURE
Alfred N. Ormond, 11969 E. Riveria Road,
Santa Fe Springs, Calif.
Filed Sept. 12, 1963, Ser. No. 308,564
1 Claim. (Cl. 248—5)

This invention relates generally to flexure type supports and more particularly, to novel shroud flexure structure for supporting a member for omni-directional movement substantially in a given plane.

In running side force load tests on various members such as missiles or rocket engines, it is desirable to support the member in such a manner that it is free to execute omni-directional movements substantially in a given plane and yet in which adequate support is provided for thrust loads or forces in a direction normal to the plane. Simple flexures including a leaf or flexure web will permit movement of the supported body back and forth in one direction.

Compounding two such flexures by stacking one on top of the other with their webs oriented at right angles will permit omni-directional movement in substantially a single plane. However, stacking web type flexures may unduly increase the overall length of the flexure support. In addition large forces normal to the plane of movement could result in the buckling of the flexures unless the flexure webs themselves are dimensioned to withstand such forces. In this later event, the stiffness of the flexure opposing movement in the side direction may be too large to permit proper side force components to be accurately measured.

With the foregoing in mind, it is accordingly a primary object of this invention to provide a novel flexure structure which will serve to support a body for omni-directional movement substantially in a given plane, and yet in which the flexure structure itself can withstand extremely high forces normal to such plane.

Another important object is to provide an improved flexure support for a member offering relatively little flexure resistance to movement in a given plane and yet which is relatively compact in configuration.

Briefly, these and many other objects and advantages of this invention are attained by providing first and second frame structures, first portions of which are adapted to be secured respectively to a member to be supported and a stationary structure or load cell. Other portions in turn are interconnected by a flexure means such that when a compressive load is placed on the flexure, the interconnecting flexure means will be placed in tension. There is accordingly offered a very high resistance to such load forces and yet very little resistance to motion in the desired plane of movement of the member.

In accordance with the preferred embodiment of the invention, the structures are in the form of an outer cylindrically shaped frame terminating at one end in an inwardly radially extending flange to define a first ledge, and an inner frame disposed within the outer cylinder and having an outwardly radially extending flange defining a second ledge opposed to said first ledge. A plurality of flexure columns in turn are circumferentially spaced about the axis of the cylindrically shaped outer frame and extend between the opposed ledges with their ends secured to these ledges. By employing a large number of such columns, extremely high strength is provided for thrust forces or loads in a direction normal to the plane of movement and yet lateral movement can take place with relatively little resistance.

Figure 2:
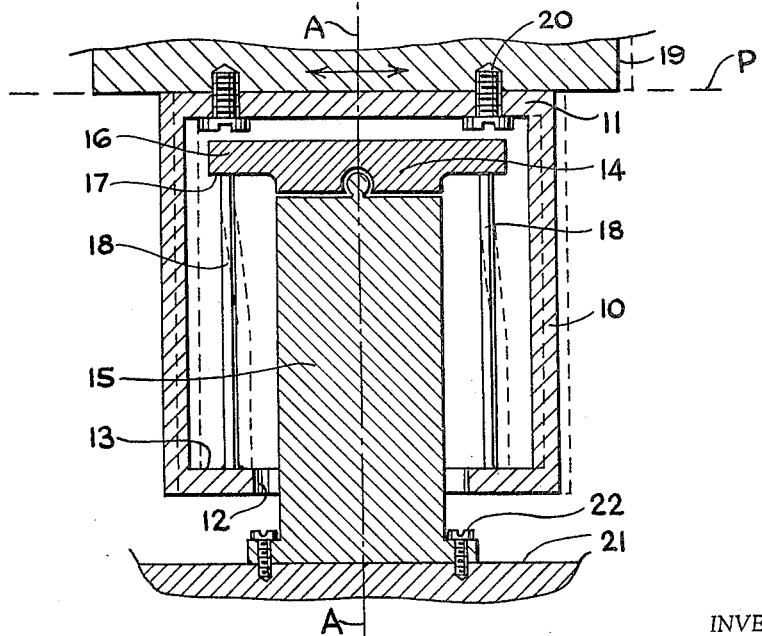

A better understanding of the invention will be had by now referring to one embodiment thereof as illustrated in the accompanying drawings, in which:

FIGURE 1 is a cut-away perspective view of the shroud flexure of this invention in conjunction with a load cell; and, FIGURE 2 is a cross-section of the flexure shown in a position for securing a member relative to a stationary structure through the medium of the load cell, looking generally in the direction of the arrows 2—2 of FIGURE 1.

Referring to FIGURE 1 the shroud flexure includes a first or outer frame means 10 generally of cylindrical shape. One end 11 of this frame means is arranged to be secured to a member to be supported relative to a stationary structure. The other end of the frame means 10 terminates in an inwardly extending flange 12 defining a first annular ledge 13 facing generally upwardly.

Cooperating with the first frame structure 10 is a second frame structure 14 having a center portion coupled to a load cell 15 in turn adapted to be secured to a stationary structure. The frame 14 includes an annular flange 16 which extends radially outwardly to define a second annular ledge 17 in opposed relationship to the first annular ledge 13. A plurality of interconnecting means in the form of columns 18 are connected between the opposing ledges 13 and 17 as shown. These columns are parallel to the axis A—A of the shroud frame structure 10 and are uniformly circumferentially spaced about this axis as shown.

With particular reference to FIGURE 2, there is illustrated a member 19 which may constitute a missile body or rocket engine secured to the upper end 11 of the first frame structure 10 as by screws 20. The lower end of the load cell 15 supporting the second frame structure 14 in turn is secured to a stationary structure 21 as by screws 22. With this arrangement, the supported member 19 may execute omni-directional movements substantially in a horizontal plane P with respect to the stationary structure 21. Thus, as indicated by the dotted lines, when the member 19 moves to the right a given distance, the flexure columns 18 will individually deform as shown and in view of their large number, they offer relatively little stiffness. By employing a large number of columns 18, the flexure can withstand large forces normal to the plane P or in the direction of the axis A—A, these columns being placed in tension when a compressive load is exerted on the flexure by the member 19.

The general shroud configuration wherein the frame structure 16 is positioned within the cylindrically shaped outer frame 10 provides for an extremely compact flexure. Yet, by providing a large number of the columns 18 substantially uniformly circumferentially distributed about the axis A—A in a symmetrical manner, omni-directional movements of the member 19 substantially in the plane P can readily take place.

The load cell 15 may serve to measure forces placing the cell in either compression or tension. If the cell 15 is not used, a rigid frame or structural member from the stationary structure would extend upwardly within the cylinder 10 to connect to the frame 14.

From the foregoing description, it will be evident that the present invention has provided a greatly improved flexure support. While only one particular embodiment of the shroud flexure has been shown, the invention is not to be thought of as limited to the particular example set forth merely for illustrative purposes.

What is claimed is:

A shroud flexure for supporting a member for omni-directional movement substantially in a given plane relative to a stationary structure, comprising, in combination: a first frame structure having a generally cup-shaped cylindrical configuration with one end in said plane adapted to be secured to said member and its other end extending away from said plane and defining the open end of said cup-shaped cylindrical configuration, said other end turning in a radial direction to define a first annular ledge facing said plane; a second frame structure in co-axial relationship with said first frame structure and having a center portion adapted to be coupled to said stationary structure and including radially extending flange means defining a second annular ledge closer to said plane than said first annular ledge and facing away from said plane in opposing relationship to said first annular ledge; and a plurality of columns secured between said first and second annular ledges and circumferentially spaced about an axis normal to said plane, said axis passing through said one end of said first frame structure and said center portion of said second frame structure, said columns being parallel to each other and to said axis whereby a compressive load on said first frame structure by said member places said columns in tension.

References Cited by the Examiner
UNITED STATES PATENTS

| | | | |
|---|---|---|---|
| 2,524,693 | 10/1950 | Bryant | 248—20 X |
| 2,583,579 | 1/1952 | Lodge | 248—18 X |
| 2,932,482 | 4/1960 | Dickie | 248—358 |
| 3,081,552 | 3/1963 | Reason | 248—358 X |
| 3,089,389 | 5/1963 | Andrews et al. | 248—358 X |

CLAUDE A. LE ROY, *Primary Examiner.*

FRANK L. ABBOTT, CHANCELLOR E. HARRIS,
*Examiners.*

J. PETO, *Assistant Examiner.*